United States Patent [19]
Aonuma et al.

[11] 3,764,708
[45] Oct. 9, 1973

[54] METHOD OF PREPARING SOY AND MISO-PASTE

[75] Inventors: Tatsuo Aonuma, Kashiwa; Atsushi Yasuda, Noda; Toshizumi Yuasa, Noda; Akira Arai, Noda; Koya Mogi, Noda; Tamotsu Yokotsuka, Nagareyama, all of Japan

[73] Assignee: Kikkoman Shoyu Co., Ltd., Noda-shi, Chiba-ken, Japan

[22] Filed: Aug. 11, 1971

[21] Appl. No.: 170,874

[52] U.S. Cl. .................... 426/46, 426/511, 426/507
[51] Int. Cl. ............................ A23l 1/20, A23l 1/22
[58] Field of Search ........................... 99/145, 98, 99

[56] References Cited
UNITED STATES PATENTS
3,647,484   3/1972   Yokotsuka et al. .................... 99/145

*Primary Examiner*—A. Louis Monacell
*Assistant Examiner*—William Andrew Simons
*Attorney*—E. F. Wenderoth et al.

[57] ABSTRACT

A method of preparing soy and miso-paste of superior flavor and taste and of high quality, which comprises treating the starting soy-beans and/or carbohydrates with a current of superheated steam at a gauge pressure of 4 to 8 kg/cm$^2$ and a temperature of 200°C. to 280°C. for a time not exceeding 15 seconds. The treated soybeans are quickly exhausted into the atmosphere at atmospheric pressure.

24 Claims, 1 Drawing Figure

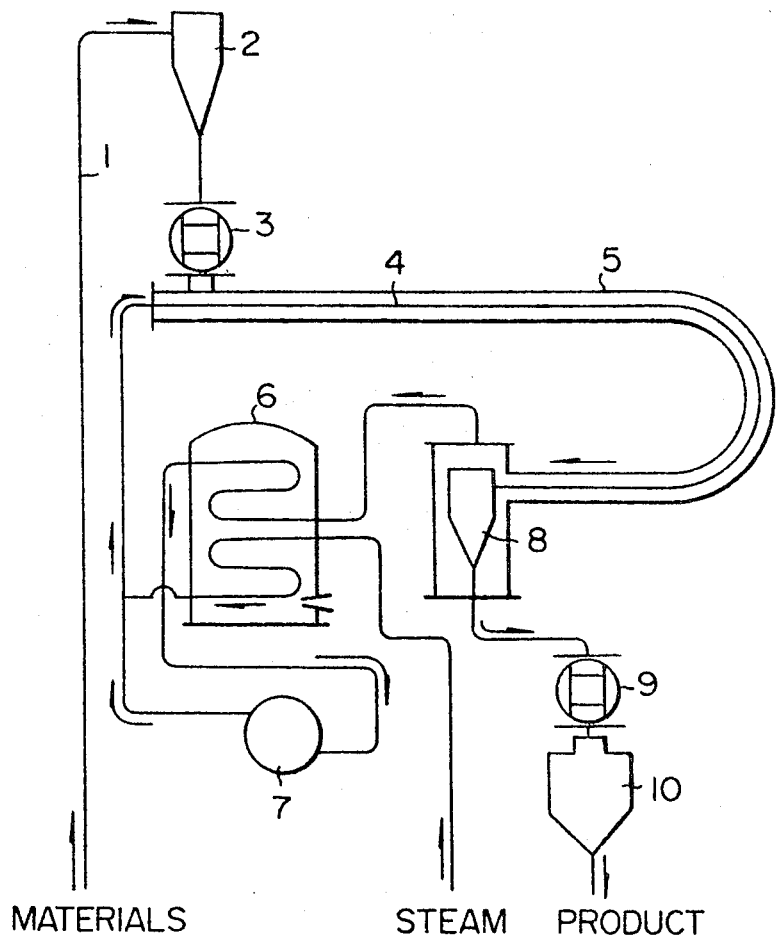
MATERIALS    STEAM   PRODUCT
TATSUO AONUMA,
ATSUSHI YASUDA,
TOSHIZUMI YUASA,
AKIRA ARAI,
KOYA MOGI and
TAMOTSU YOKOTSUKA,
Inventors

METHOD OF PREPARING SOY AND MISO-PASTE

This invention relates to a method of preparing soy and miso-paste (miso or bean-paste) of superior flavor and taste and of high quality, using an improved method of treating the starting soybeans and/or carbohydrates. The method can be performed commercially advantageously in improved yields with good reproducibility.

More specifically, the invention relates to an improved method of preparing soy or miso-paste wherein the starting soybeans and carbohydrates, either one of both of them, are steam treated using a superheated steam current.

A method of preparing soy is known which comprises steaming soybeans, mixing the steamed soybeans principally with steamed or parched carbohydrates as the starting materials, inoculating this mixture with aspergilli, culturing the mixture to form solid Koji, adding a solution of common salt to form a soy mash, and removing the solid portion from the brew mash so obtained. A method of preparing miso-paste is also known which comprises steaming soybeans, mixing the steamed soybeans with aspergilli and cultivating them, adding common salt, and brewing the mixture so obtained to form a miso-paste.

A Protein containing materials of vegetable origin, such as soybeans or defatted soybeans, are used for the production of soy or miso-paste, and as the carbohydrates, starch-containing materials of vegetable origin such as rice, wheat, or barley are utilized. On the basis of information obtained from long years of experience, the soybeans are used after soaking them in water or spraying water on them to give them sufficient moisture content, and steaming then with saturated steam at a gauge pressure of the order of 0.1 – 1.0 Kg/mc$^2$ (about 100° to 119°C. as the steam temperature) for about 30 to 180 minutes; for the preparation of soy, the wheat is used after parching and crushing it at normal atmospheric pressure; and for the production of miso-paste, the rice or barley is used after soaking it in water to give it sufficient moisture, and then steaming it with saturated steam at normal atmospheric pressure for about 60 to 90 minutes. These conditions have been employed as optimum conditions for the preparation of soy or miso-paste by the brewing method.

The heat-treatment of the starting soybeans and/or carbohydrates as described above is performed for the purpose of modifying proteins and starch contained in the starting materials to a state suitable for enzymatic digestion which these materials undergo during the preparation of soy or miso-paste. If the degree of modification (or denaturation) is either excessive or insufficient, soy or miso-paste of good quality cannot be obtained.

We have conducted extensive research for long years with a view to improving such a heat-treatment process, and proposed a steaming treatment using saturated steam in which soybeans of a moisture content 30 – 70 percent by weight are steamed in the presence of saturated steam at a gauge pressure not less than 1.8 kilograms per square centimeter for a time not exceeding 10 minutes, and the steamed soybeans are quickly cooled to a temperature not exceeding 100°C. Thus, we made it clear that the heat treatment of the starting soybeans can give soy with an improved rate of digestion of the soybeans and improved turbidity grade (U. S. Pat. application Ser. No. 802,969 now issued as U. S. Pat. No. 3,647,484.

It has now been found that a further improved method of producing soy can be realized by utilizing superheated steam instead of saturated steam, and the use of super-heated steam also leads to the improvement of miso-paste production. We have also found that this method is applicable to the heat-treatment of carbohydrates with excellent improvement.

Unexpectedly, we found that by using this method, the step of giving sufficient moisture content to the starting soybeans, rice, barley, etc., which has been regarded as essential in the conventional steaming treatment of the starting materials can be ommitted, and the best improvement can be achieved when the starting materials have a moisture content less than 20 percent by weight, especially not exceeding 15 percent by weight.

It has also been found that by using superheated steam, the starting soybeans and/or carbohydrates in the form of granules, flakes or powder can be treated as they are being suspended and carried in a superheated steam current, whereby there is no liklihood of partially excessive or insufficient denaturation of the starting mass, and hence, partial non-uniformity of enzymatic digestion during the soy or miso-paste preparation can be avoided to provide good quality mash and products of uniform quality with good reproducibility.

It has also been discovered that the steaming operation can be simplified and the steaming equipment can be made in a compact size; the steam treatment can be continuously carried out with high efficiency; and the adhesion of the starting soybeans and/or carbohydrate to the inner wall of the steaming zone can be prevented and hance the undesirable excessive denaturation or carbonization in extreme cases can be avoided, thereby to provide soy or miso-paste of good quality.

Accordingly, an object of the present invention is to provide an improved method of producing soy or mise-paste of superior flavor and taste and of good quality in good yields and with good reproducibility, which method is also advantageous in respect of both the operation and equipment needed.

Many other objects and advantages of the present invention will become apparent from the following description.

The starting soybeans and carbohydrates used in the present invention may be used in the original form in the case of granular rice, wheat, barley, etc., and flaky defatted soybeans generally used for brewing purposes. But they may be crushed or flattened prior to use so that they are readily dispersed or suspended in a superheated steam current. Especially in the case of granular soybeans or defatted soybean meal of non-uniform grain sizes, it is preferred that they should be crushed and/or flattened to form flakes before use.

In the conventional method, the raw material is caused to take up water by soaking it in water or spraying water onto it prior to steam treatment. This moisture-giving step can be completely omitted in the method of the present invention, and additional application of sufficient water to the material may result in excessive denaturation of the starting soybeans and/or carbohydrates. It is preferred therefore that in the present invention, and moisture content of the raw material should be less than 20 percent by weight, especially not over 15 percent by weight. It is assumed that this will be ascribable to the fact that saturated steam is utilized in the conventional methods, whereas superheated steam of at least 200°C. is used in the present invention, and the soybeans and/or carbohydrates are subjected to steam treatment while being suspended and being carried in a superheated steam current.

Generally, untreated soybeans and carbohydrates contain about 8 – 15 percent by weight of a moisture content. In the present invention, the steam treatment is performed with a remarkably high rate of heat transmission, remarkably strong stirring effect, remarkably uniform steaming effect, and remarkably fast rate of denaturation as compared with the steam treatment of the conventional method using saturated steam under the same conditions. According to the present invention, the moisture-giving treatment can be completely omitted, which omission has not been possible previously because of the formation of substantial amounts of native materials. The presence of water as much as about 30 percent or more, which is attained by the moisture-giving treatment of soybeans and carbohydrates, should be avoided in the present invention in view of the adhesion of the material to the inner wall of the reactor and excessive degrees of denaturation.

The superheated steam used in the method of the present invention should have a gauge pressure ranging from 4 to 8 $Kg/cm^2$ and a temperature ranging from 200°C. to 280°C. The pressure and temperature are properly chosen according to the type and shape of the material and the speed of superheated steam current, etc.

The time needed for the material to reside in the steam treating zone in a floating condition, namely, the treating time should not exceed 15 seconds, and the preferred treating period is 3 to 10 seconds. Therefore, a treating procedure of the type in which the material is conducted countercurrently with superheated steam in a vertical-type steam treating zone is not desirable because the material tends to be locally denatured excessively depending upon the shape, particle size, and specific gravity of the material. With both a vertical type or transverse type treating zone, it is preferred that the material should be contacted with superheated steam concurrently in the tubular treating zone, and the treatment should be performed while the particles of the material are suspended and are carried by the steam current.

It the steam temperature is too low, i.e. outside the range of 200° to 280°C., the denaturation of the material is insufficient, and too high temperatures cause excessive denaturation or even carbonization of the material. If the gauge pressure of the superheated steam is too low, i.e. outside the range of 4 to 8 $Kg/cm^2$, the puffing of the steam treated solid particles of the material, when they are exhausted, is insufficient, the degree of denaturation (denaturation of proteins and/or conversion of starch into an alpha form) becomes different between the surface layer and the core portion of the particles of the material, and the denaturation of th core portion is likely to be insufficient. Furthermore, when the material is cultured with the inoculation of aspergilli, the aspergilli does not grow uniformly even in the core portion. If the pressure is too high, i.e. beyond the specified range, disadvantages are brought about in respect of the equipment and operation. When the steam treating time becomes too long, it becomes a cause of excessive denaturation or carbonization.

The time needed to treat the starting soybeans and/or carbohydrates and the pressure and temperature of superheated steam affect each other, and influence the degree of denaturation of the raw materials. These conditions can be properly chosen within the above specified ranges by considering the type, shape, grain size, and specific gravity of the raw materials, and optimum conditions can be easily determined experimentally. Where the type, shape, grain size, and specific gravity of the raw meterial are constant, it is the general practice to use shorter treating times for higher temperatures and pressures, or vice versa within the above-specified ranges. Furthermore, when it is desired to steam treat soybeans of defatted soybeans primarily for the purpose of denaturing their proteins, it is generally preferred to employ superheated steam having a gauge pressure of 4 to 7 $Kg/cm^2$ and a temperature of 200° to 280°C. Where the denaturation (conversion into alpha form) of starch of rice, wheat or barley is intended, the superheated steam preferably has a gauge pressure of 6 to 8 $Kg/cm^2$ and a temperature of 250° to 280°C.

The starting soybeans and/or carbohydrates which have been treated with the superheated steam are then exhausted quickly into the atmosphere at normal atmospheric pressure or at pressures around atmospheric. The atmospheric pressure, as used in the present invention, means normal atmospheric pressure or pressures around it which include reduced or elevated pressures which may be generated spontaneously because of the nature of the equipment and operation used.

By this rapid exhaustion, the treated soybeans and/or carbohydrates are rapidly cooled and puffed and thus excessive modification can be conveniently avoided.

In the preparation of soy in accordance with this invention, soybeans should preferably be treated with superheated steam. Soybeans and carbohydrates may be treated with superheated steam together or individually. Or it is possible to treat soybeans with superheated steam, and subject the carbohydrates to a usual treatment. If desired, soybeans may be treated with steam in a usual manner, and the carbohydrates, with superheated steam in accordance with the method of the present invention.

In the case of producing miso-paste, too, the same procedure as described above can be used to effect steam treatment using superheated steam.

The soybean and/or carbohydrates treated with superheated steam by the mehod of the present invention are obtained in a dried state represented by a moisture content of 4 to 10 percent by weight or so. Hence, they have good preservability, and can be used after storage; there is no need to use them immediately after steam treatment as in the conventional method. Since this steamed, puffed material is in the dried state, there is no fear of putrefaction, and starch present therein is maintained in the alphaform. Therefore, even when treated material is used after storage, it need not be subjected to the treatment, (denaturation of proteins and conversion of starch into the alpha form) again by such means as steaming or parching, but it can be used as Koji-producing meterial or material for preparation of soy and misopaste usually with addition of a suitable amount of water. If desired, it can be used without addition of water.

Using the attached drawing which shows the arrangement of an apparatus for performing the steaming and puffing of the material in the method of the present invention, one embodiment of the steaming step in the method of the present invention will be described below.

If desired, the starting soybeans and carbohydrates in the form of granules, flakes or powders may be perheated. For instance, the materials are transported together with a heated air current through a tube 1. The materials are separated from the air by means of a cyclone separator 2, and continuously transferred by a rotary feeder 3 into a heated tube 4 which constitutes a steaming treatment zone. Superheated steam heated by a superheated 6 is passed through the heated tube 4 equipped with a warmth-preserving tube 5 therearound by means of a circulating blower 7. The materials are carried on a current of the superheated steam in a dispersed and floating state in the current of superheated steam, whereby the materials are heated and denatured. The treating time of the materials can be freely controlled by changing the length of the heated tube 4 and the rate of flow of superheated steam. The materials so heat-treated are separated from the superheated steam current by a cyclone separator 8, and via a rotary feeder 9, are abruptly discharged in a puffing can 10 at atmospheric pressure. The materials are withdrawn as steamed materials for the production of soy or miso-paste.

When the treated materials are used for the production of Koji for use in preparing soy, a suitable amount of water is added to the steam treated materials such as soybeans or defatted soybeans, and they are mixed with parched and crushed wheat obtained by the conventional method or with steamed wheat obtained by the method of the present invention as such or in a crushed form. Seed Koji is added to the mixture, and then the mixture is subjected to Koji preparation. Alternatively, soybeans or defatted soybeans steamed by the conventional method are added to steamed wheat obtained by the method of the present invention as such or in a crushed form, and after mixing seed Koji, the mixture is used for Koji preparation. In still another embodiment, a mixture of soybeans or defatted soybeans and wheat is subjected to the steam treatment by the method of the present invention, and with or without crushing, a suitable amount of water is added to the treated mixture. The mixture is used fo Koji preparation after adding seed Koji.

When the materials treated by the method of the present invention are used for the production of Koji for miso-paste, a suitable amount of water is added to the treated materials such as soybeans, defatted soybeans, rice or barley obtained by the method of the present invention with or without crushing, and on addition of seed Koji, the mixture is used for Koji preparation. The soybeans or defatted soybeans steamed by the method of the present invention can be used directly or after adding a suitable amount of water, and then brewed by mixing with the above Koji and common salt.

The steamed and puffed materials obtained by the method of the present invention have very good water abosrption, and even cold water can be adsorbed by these materials within short periods of time. The use of warm or hot water, however, is preferred for continuous commercial operation because the water absorbing time can be further shortened.

The present invention will be described further by the following Examples which are presented for illustrative, rather than limitative, purposes.

EXAMPLE 1

Defatted soybeam flakes (99 Kg) were dispersed and floated in a current of superheated steam at a gauge pressure of 6.0 Kg/cm$^2$ and a temperature of 250°C., an while being transported continuously in this condition, were heated for 5 seconds. The heated soybean flakes were abruptly discharged into a region held at atmospheric pressure thereby to obtain steamed and puffed soybeam flakes. Hot water (136 liters) at 85°C. was sprinkled over the resulting defatted soybean flakes, and then by passing sterilized air, the flakes were cooled to 40°C. Parched and crushed wheat (94 Kg) obtained by the conventional method was added, and seed Koji was mixed to prepare Koji. 360 liters of 24.5 percent saline water was added, and the mixture was matured for 120 days at 30°C.

For comparison, in accordance with a conventional method, 129 liters of water was sprinkled over 99 Kg of defatted soybean flakes, and the flakes were steamed for 45 minutes with saturated steam at a gauge pressure of 0.9 Kg/cm$^2$. To the steamed flakes were added 94 Kg of parched and crushed wheat, and seen Koji was mixed to prepare Koji. 360 liters of 24.5 percent saline water was added, and the mixture was matured for 120 days at 30°C.

The components of soy produced after removing the solid portion from the above soy mash were compared with those of soy produced by the conventional method, and the results are given in Table 1 below. The yield of nitrogen indicated in the Table 1, denotes the ratio of the total nitrogen dissolved in the liquid portion of the matured soy mash to the total nitrogen of the protein contained in the soybean and wheat, the soy starting materials.

TABLE 1

| Components | Present invention | Conventional method |
|---|---|---|
| Common salt (g/100 ml.) | 17.55 | 17.55 |
| Total nitrogen (g/100 ml.) | 1.808 | 1.680 |
| Amino nitrogen (g/100 ml.) | 0.890 | 0.828 |
| Glutamic acid (g/100 ml.) | 1.484 | 1.376 |
| Reducing sugar (g/100 ml.) | 2.52 | 2.60 |
| Alcohol (Vol %) | 2.08 | 2.01 |
| Yield of nitrogen (%) | 89.42 | 82.93 |
| Amino nitrogen/total nitrogen (%) | 49.25 | 49.33 |
| Glutamic acid/total nitrogen (%) | 0.821 | 0.819 |

It is seen from the results shown in Table 1 that the yield of nitrogen has been greatly increased according to the invention and as a result, the yield of soy has been greatly increased. And according to the invention the treating time is considerably shortened. It is possible therefore to adapt the equipment for continuous operation and economical advantages such as increased working efficiency can be obtained, which contribute much to the soy producing industry.

EXAMPLE 2

Granular soybeans (120 Kg) were flattened into flakes each having a thickness of 0.6 mm, and dispersed and floated in a current of superheated steam at a gauge pressure of 6.0 Kg/cm$^2$ and a temperature of 270°C., and while being transported in this condition continuously, are heated for 6 seconds. The heated soybeans were discharged abruptly into a region held at atmospheric pressure to yield steamed and puffed soybean flakes. 173 liters of tap water was sprinkled onto the flakes, and 94 Kg of parched and crushed wheat was added. Seed Koji was mixed, and Koji was prepared. 360 liters of 24.5 percent saline water was added, and the mixture was matured for 1 year at room temperature to form soy mash of good flavor. The solid portion was removed from this mash to obtain soy.

EXAMPLE 3

A mixture of 99 Kg of defatted soybean meal and 106 Kg of wheat dispersed and floated in a current of superheated steam at a gauge pressure of 7.0 Kg/cm$^2$ and a temperature of 280°C., and while being transported continuously in this condition, were heated for 10 seconds. The heated mixture was abruptly discharged into a region held at atmospheric pressure to form a steamed amd puffed mixture of defatted soybean meal and wheat, Hot water (131 liters) at 85°C. was sprinkled over the treated mixture, and by passing sterilized air, the mixture was cooled down to 40°C. Seed Koji was mixed, and Koji was prepared. 360 liters of 24.5 percent saline water was added, and the mixture was matured for 120 days at 28°C. to yield soy mash of good flavor. The solid portion was removed from this mash to obtain soy.

EXAMPLE 4

106 Kg of wheat was dispersed and floated in a current of superheated steam having a gauge pressure of 8.0 Kg/cm$^2$ and a temperature of 260°C., and while being transported continuously in this condition, were heated for 8 seconds. The heated wheat was then abruptly discharged into the atmosphere at normal atmospheric pressure. The steamed and puffed wheat was crushed. Defatted soybeans (raw material defatted soybeans 99 Kg) which had been subjected to usual water sprinkling and steaming were mixed with the crushed wheat, and seen Koji was added to prepare Koji. 360 liters of 24.5 percent saline water was added, and the mixture was matured for 150 days at 26° – 30°C. Matured soy mash of good flavor was obtained. The solid portion was removed from this mash to obtain soy.

EXAMPLE 5

A mixture of 100 Kg defatted sybean flakes and 15 Kg of wheat was dispersed and floated in a current of superheated steam at a gauge pressure of 8.0 Kg/cm$^2$ and a temperature of 280°C., and while being transported continuously in this condition, were heated for 8 seconds. The heated mixture was abruptly discharged into the atmosphere at atmospheric pressure. The steamed and puffed mixture of defatted soybean flakes and wheat was crushed, and 100 liters of water was sprinkled. The mixture was made into a cylindrical shape having a diameter of 13 mm. Seed Koji was added, and Koji was prepared in accordance with the usual method of producing tamari soy. 300 liters of 25.5 percent saline water was added, and the mixture as maturened for 120 days at 30°C. to yield tamari soy mash of good taste. The solid portion was removed from this mash to obtain soy.

EXAMPLE 6

30 Kg of rice was dispersed and floated in a current of superheated steam having a gauge pressure of 6.0 Kg/cm$^2$ and a temperature of 250°C., and while being transported continuously in this condition, were heated for 6 seconds. The heated rice was abruptly discharged into the atmosphere at atmospheric pressure. 17 liters of water was sprinkled onto the resulting steamed and puffed rice, and seed Koji was added to prepare Koji in a usual manner. It was subjected to the rapid brewing method together with soybeans (raw material soybeans 26 Kg) soaked in water and steamed by a conventional method and 8 Kg of common salt, and the mixture was matured for one month at 30°C. to form miso-paste (so-called rice miso) of good flavor.

EXAMPLE 7

30 Kg of polished barley was soaked in water and steamed by a conventional method, and seed Koji was added to make Koji. Separately, 28 Kg of granular soybeans flattened to a thickness of 0.6 mm was dispersed and floated in a current of superheated steam having a gauge pressure of 7.0 Kg/cm$^2$ and a temperature of 260°C., and while being transported in this state continuously, were heated for 5 seconds. The heated soybeans were abruptly discharged into the atmosphere at atmospheric pressure. Hot water (29 liters) at 85°C. was added to the resulting steamed and puffed soybean flakes, and by passing sterilized air, the flakes were cooled down to 40°C. These soybeans were mixed with said Koji and 13 Kg of common salt, and the mixture was matured for 3 months at 30°C. to form miso-paste (so-called barley miso) of good flavor.

EXAMPLE 8

A mixture of 580 Kg of granular soybeans flattened to a thickness of 0.6 mm and 30 Kg of wheat was dispersed and floated in a current of superheated steam at a gauge pressure of 7.0 Kg/cm$^2$ and a temperature of 280°C., and while being transported continuously in this condition, were heated for 7 seconds. The heated mixture was abruptly discharged into the atmosphere at atmospheric pressure. Hot water (355 liters) at 85°C. was sprinkled onto the mixture of steamed and puffed soybeans and wheat, and by passing sterilized cool air, the mixture was cooled down to 40°C. Seed Koji was added, and Koji was prepared. Koji obtained was mixed with 106 Kg of common salt and 51 liters of 17.0 percent saline water, and the mixture was matured for 5 months at 30°C. to yield miso-paste (so-called soybean miso) of good flavor.

EXAMPLE 9

28 Kg of granular soybeans were flattened to a thickness of 0.6 mm each, and dispersed and floated in a current of superheated steam at a gauge pressure of 6.5 Kg/cm$^2$ and a temperature of 250°C. While being transported continuously in this state, the soybeans were heated for 6 seconds, and then abruptly discharged into the atmosphere at atmospheric pressure. Hot water (29 liters) at 85°C. was sprinkled onto the resulting steamed and puffed soybean flakes, and by passing sterilized air, the flakes were cooled.

For comparison, 28 Kg of soybeans were soaked in water in a customary manner, and then steamed with saturated steam at a gauge pressure of 0.3 Kg/cm$^2$ for one hour and 30 minutes, followed by cooling under reduced pressure.

Each of these materials was mixed with rice Koji prepared from 30 Kg of rice in a customary manner together with 8 Kg of common salt in accordance with the rapid brewing method, and the mixture was matured for one month at 30°C. The products were analyzed, and the results are shown in Table 2 below.

TABLE 2

| Components | Present invention | Conventional process (comparison) |
|---|---|---|
| Moisture content (%) | 48.30 | 48.63 |
| Common salt (%) | 7.95 | 8.03 |
| Amino nitrogen (%) | 0.476 | 0.336 |
| Starch (%) | 5.10 | 5.25 |

It is seen from these results that a product of better taste and flavor having more amino nitrogen content can be obtained from the material treated by the method of the present invention then from the material treated by the conventional process. The method is commerically advantageous as in the case of producing soy in many aspects including the adaptation of the equipment for continuous operation.

What we claim is:

1. In the method of preparing soy by steaming soybeans, mixing the steamed soybeans principally with steamed or parched carboyhdrates as the starting materials, inoculating this mixture with aspergilli, culturing the mixture to form solid Koji, adding a solution of common salt to form a soy mash and removing the solid portion from the brew mash to obtain liquid soy, the improvement wherein the initial steam treatment is carried out by steaming the soybeans in the form of granules, flakes or powder being suspended and carried in a current of superheated steam at a gauge pressure of 4 to 8 Kg/cm² and a temperature of 200°C. to 280°C. for a time not exceeding 15 seconds, and then the treated soybeans are quickly exhausted into the atmosphere at atmospheric pressure.

2. A method of claim 1, wherein the moisture content of the untreated soybeans in the form of granules, flakes or powder does not exceed 20 percent by weight.

3. A method of claim 1, wherein the carbohydrates to be mixed with the steamed soybeans are steam treated in the same way.

4. A method of claim 3, wherein the moisture content of the untreated carbohydrates in the form of granules, flakes or powder does not exceed 20 percent by weight.

5. A method of claim 3, wherein the superheated steam has a gauge pressure of 6 to 8 Kg/cm² and a temperature of 250°C. to 280°C.

6. A method of claim 1, wherein said superheated steam has a gauge pressure of 4 to 7 Kg/cm² and a temperature of 200°C. to 280°C.

7. In the method of preparing miso-paste by steaming soybeans, mixing the steamed soybeans with a solid Koji, said Koji being obtained by inoculating carbohydrates with aspergilli and cultivating them, adding common salt, and brewing the mixture thus obtained to form miso-paste, the improvement wherein the initial steam treatment is carried out by steaming the soybeans in the form of granules, flakes or power being suspended and carried in a current of superheated steam at a gauge pressure of 4 to 8 Kg/cm² and a temperature of 200°C. to 280°C. for a time not exceeding 15 seconds, and then the treated soybeans are quickly exhausted into the atmosphere at atmospheric pressure.

8. A method of claim 7, wherein the moisture content of the untreated soybeans in the form of granules, flakes or powders does not exceed 20 percent by weight.

9. A method of claim 7, wherein the carbohydrates for preparing the solid Koji are steam treated in the same way.

10. A method of claim 9, wherein the moisture content of the untreated carbohydrates in the form of granules, flakes or powder does not exceed 20 percent by weight.

11. A method fo claim 9, wherein said superheated steam has a gauge pressure of 6 to 8 Kg/cm² and a temperature of 250°C. to 280°C.

12. A method of claim 7, wherein said superheated steam has a gauge pressure of 4 to 7 Kg/cm² and a temperature of 200°C. to 280°C.

13. In the method of preparing miso-paste by steaming soybeans, mixing the steamed soybeans principally with steamed or parched carbohydrates as the starting materials, inoculating this mixture with aspergilli and cultivating it to form a solid Koji, adding common salt, and brewing the mixture thus obtained to form a miso-paste, the improvement wherein the steam treatment is carried out by steaming the soybeans in the form of granules, flakes or powder being suspended and carried in a current of superheated steam at a gauge pressure of 4 to 8 Kg/cm² and a temperature of 200°C. to 280°C. for a time not exceeding 15 seconds, and then the treated soybeans are quickly exhausted into the atmosphere at atmospheric pressure.

14. A method of claim 13, wherein the moisture content of the untreated soybeans in the form of granules, flakes or powder does not exceed 20 percent by weight.

15. A method of claim 13, wherein the carbohydrates to be mixed with the steamed soybeans are ateam treated in the same way.

16. A method of claim 15, wherein the moisture content of the untreated carbohydrates in the form of granules, flakes, or powder does not exceed 20 percent by weight.

17. A method of claim 15, wherein said superheated steam has a gauge pressure of 4 to 8 Kg/cm² and a temperature of 250°C. to 280°C.

18. A method of claim 13, wherein said superheated steam has a gauge pressure of 4 to 7 Kg/cm² and a temperature of 200°C. to 280°C.

19. In the method of preparing soy by steaming soybeans mixing the steamed soybeans principally with steamed carbohydrates as the starting materials, inoculating this mixture with aspergilli, culturing the mixture to form solid Koji, adding a solution of common salt to form a soy mash and removing the solid portion from the brew mash to obtain liquid soy the improvement wherein the initial steam treatment of said carbohydrates is carried out by steaming the carbohydrates in the form of granules, flakes or powder being suspended and carried in a current of superheated steam at a gauge pressure of 4 to 8 Kg/cm² and a temperature of 200°C. to 280°C. for a time not exceeding 15 seconds, and then the treated carbohydrates are quickly exhausted into the atmosphere at atmospheric pressure.

20. A method of claim 19, wherein the moisture content of the untreated carbohydrates in the form of granules, flakes or powder does not exceed 20 percent by weight.

21. A method of claim 19, wherein said superheated steam has a gauge pressure of 6 to 8 Kg/cm$^2$ and a temperature of 250°C. to 280°C.

22. In the method of preparing miso-paste by steaming soybeans, mixing the steam soybeans with a solid Koji, said Koji being obtained by inoculating steamed carbohydrates with aspergilli and cultivating them, adding common salt, brewing the mixture thus obtained to form a miso-paste, the improvement wherein the initial steam treatment of carbohydrates is carried out by steaming the carbohydrates in the form of granules, flakes or powder being suspended and carried in a current of superheated steam at a gauge pressure of 4 to 8 Kg/cm$^2$ and a temperature of 200°C. to 280°C. for a time not exceeding 15 seconds, and then the treated carbohydrates are quickly exhausted into the atmosphere at atmospheric pressure.

23. A method of claim 22, wherein the moisture content of the untreated carbohydrates in the form of granules, flakes or powder does not exceed 20 percent by weight.

24. A method of claim 22, wherein said superheated steam has a gauge pressure of 6 to 8 Kg/cm$^2$ and a temperature of 250°C. to 280°C.

* * * * *